United States Patent [19]

Corkin, Jr.

[11] 4,031,376
[45] June 21, 1977

[54] CALCULATING METHOD AND APPARATUS FOR HANDICAPPING THOROUGHBRED RACES AND THE LIKE

[76] Inventor: Samuel Corkin, Jr., 339 Davis Ave., Kearny, N.J. 07032

[22] Filed: June 30, 1975

[21] Appl. No.: 579,942

[52] U.S. Cl. .............................. 235/156; 235/92 TS
[51] Int. Cl.² .......................................... G06F 7/38
[58] Field of Search ............. 235/156, 78, 83, 179, 235/88, 92 TA, 92 TS, 168, 193, 152; 445/1

[56] References Cited

UNITED STATES PATENTS

| | | | |
|---|---|---|---|
| 3,569,686 | 3/1971 | Comorau | 235/193 |
| 3,863,060 | 1/1975 | Rode et al. | 235/156 |

*Primary Examiner*—Malcolm A. Morrison
*Assistant Examiner*—Errol A. Krass
*Attorney, Agent, or Firm*—Arthur L. Plevy

[57] ABSTRACT

There is disclosed an electronic calculator capable of implementing a handicap formula for selecting and computing the probability of success of an entry in a racing contest based on past performance and earnings. The calculator can be used as an ordinary calculator or by means of a selector circuit, be placed in a handicapping mode to enable a user to compute the purse level of an entry at any one of a plurality of different tracks. The calculator is electronic and hence, performs all functions with great speed and ease.

14 Claims, 3 Drawing Figures

CALCULATING METHOD AND APPARATUS FOR HANDICAPPING THOROUGHBRED RACES AND THE LIKE

BACKGROUND OF THE INVENTION

This invention relates to a handicapping apparatus particularly adapted for selecting and predicting the outcome of a horse race or similar contest.

The prior art is replete with a plethora of apparatus to enable one to handicap or select horses based on past performance and other factors. Most devices are special purpose slide rules to enable a user to combine or operate on past performance data on each entry in a race and then to note the entries according to a particular formula associated with the particular scheme to be implemented.

Of course, it is apparent that certain factors can never be determined and hence, all such systems can do is to give one a better understanding of the probability associated with each entry. However, it is also realized that each entry in a race has the odds against its winning predetermined by its past performance as well as the amount of money bet on the entry prior to the race.

There are other factors which are not associated with the horse or entry which are used to compute the odds or chances of success, such as the track, the distance, the weight and so on. Hence, different systems may employ such factors as well as the past performance record of the horse.

Some examples of prior art patents which claim apparatus in conjunction with a particular scheme of selection or rating entries are as follows:

U.S. Pat. No. 2,271,508 entitled CALCULATING DEVICE by G. H. Gordon issued on Jan. 27, 1942 discloses a calculator device employing a plurality of variable resistors and a detent switch and is used for totalling bets, calculating odds and displaying odds at race tracks.

The device is not the type contemplated by this application in that this device is used at a track to compute and total the amount of money bet on each entry to thereby formulate the track odds prior to the race.

U.S. Pat. No. 2,283,799 entitled HANDICAPPING DEVICE by E. W. Favalora issued on May 19, 1942 depicts a circular slide rule having a multiplicity of scales and moving parts. The device is pertinent to a scheme for handicapping horses based on past performance as well as weight increases, variation in speed and so on.

U.S. Pat. No. 2,794,597 entitled HANDICAPPER by E. N. Maloof issued on June 4, 1957 shows another slide rule type device adapted to handicap quarter horse racing. The device employs slots or windows and a plurality of scales.

U.S. Pat. No. 3,045,406 entitled CALCULATOR by L. E. Burg issued on July 24, 1962 shows a slide calculator employing data information on both sides and used in conjunction with still another scheme or approach to handicapping race horses.

U.S. Pat. No. 3,635,397 entitled SPEED REGISTER and U.S. Pat. No. 3,701,471 entitled SPEED REGISTER both issued to J. J. Kurland relate to a circular slide rule also employing a hair line and a plurality of different scales to enable correlation of past performance data to compute and select odds and performance factors.

There are other systems employed as well, as U.S. Pat. No. 3,714,399 entitled RACE CALCULATOR, which system uses a series of rotating discs.

Generally speaking, a perusal of such patents will immediately indicate the extreme complexity of the detection schemes as well as the fact that the use of such units is extremely complicated and difficult.

The units and apparatus are difficult to make and do not withstand prolonged use because of the extreme accuracy required during operation of the same in regard to the alignment of the scales associated with the slide rule mechanisms.

Attendant with such problems is the further problem that a user must follow a complicated procedure without error as all errors accumulate and his computed result may be far off from the actual result due to his inability to make proper scale alignments.

It is therefore an object of the present invention to provide an electronic calculator apparatus operating in conjunction with a selecting or handicapping scheme to enable a user to simply and reliably compute and handicap and plurality of horses in a race based on past performance as well as consideration of the track, the earnings of the horse and other factors, as well.

The apparatus is easy to operate, quick to provide results and is sturdy and reliable, thus circumventing the problems associated with the prior art devices.

BRIEF DESCRIPTION OF PREFERRED EMBODIMENT

A hand held calculator of the digital type is particularly adapted for indicating a rating of an entry in a racing contest by operating on the past performance of said entry as regarding past wins (W), past second (S) and past third (T) and total monies earned by said entry in previous contests comprising a keyboard for keying in a code having a given number of digits of a predetermined length indicative of wins (W), seconds (S) and thirds (T), means for multiplying each of said keyed digits by a different preselected factor to obtain a separate product for each of said W,S, and T, means responsive to said products for adding the same to provide a total sum, means responsive to said sum for dividing the same by unity to provide a class factor and means for multiplying said class factor provided by said total earnings to display said product defining said rating number.

DETAILED DESCRIPTION OF FIGURES

Figure 1:
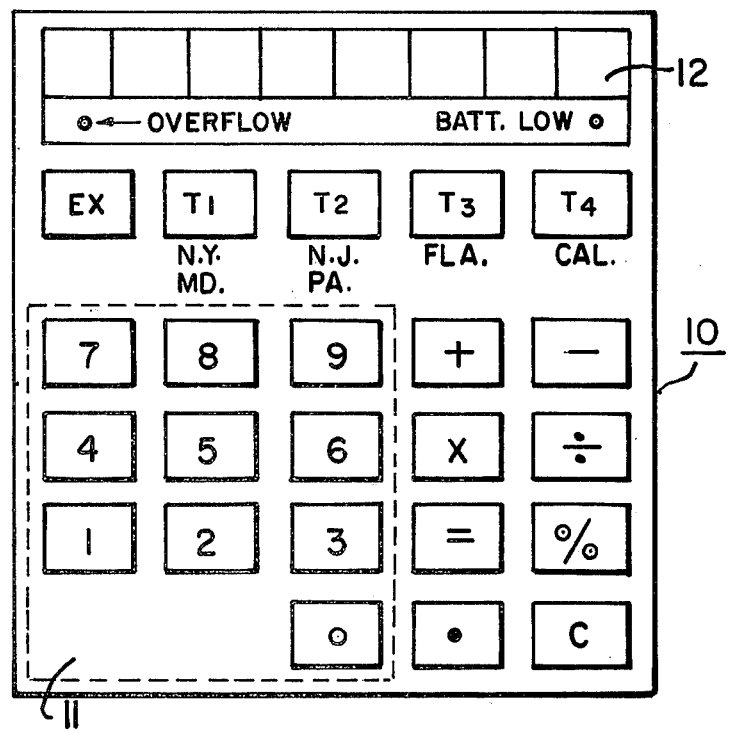
FIG. 1 is a front elevational view of a calculator according to this invention.

Referring to FIG. 1, there is shown a front view of an electronic calculator 10 which is capable of operating according to a system for handicapping Thoroughbred racing. It is noted at the onset that the calculator 10 as well as the system to be described, may also be applied to other racing events, such as trotters, dog races and so on, as long as the entries have past money-earned records or finishing positions in past performances.

Essentially, the calculator 10 is typical of an ordinary arithmetic type calculator of the hand-held variety. As is known, a plethora of such calculators exist and are sold at relatively low prices for performing all types of arithmetic functions. Hence, the calculator 10, as is conventional, employs a numerical keyboard 11 shown within the dashed line. These are the number keys 0-9 and allow a user to enter in any number which can be adapted by the length of the particular display utilized. In this example, an eight digit display 12 is shown. It is, of course, understood that more or less digits can be employed as desired. The display 12 may be any conventional display associated with such hand-held calculators as a liquid crystal display, a light emitting diode display and so on.

The front panel also contains the typical arithmetic keys for addition (+), subtraction (−), multiplication (×), divide (÷) as well as an equal (=) key for terminating a calculation, a percentage key (%), a clear key (c) and a decimel select key (.) The functions of the above keys are the same as those functions performed by existing calculators and hence, the unit 10 can operate as an ordinary calculator.

Also shown are five additional keys designated as EX or execute, $T_1$, $T_2$, $T_3$ and $T_4$. It is noted that under the T keys may be further designations as N.Y. (New York) and Md (Maryland) beneath the $T_1$ key, and N.J. (New Jersey) and Pa. (Pennsylvania) beneath the $T_2$ key and so on. These are track selector keys and depending at which track the user desires to perform a handicapping function, one of the four keys can be selected as will be explained.

While five additional keys as E$x$, $T_1$ to $T_4$ are shown, it is also understood that one may employ a selector switch to permit either a normal calculator operation or a handicap operation. Additional switches or keys may be employed as well depending upon the classification of tracks in regard to surface condition, length and so on.

The operation of the system as relating to a user is extremely simple and will be described in terms of how a user accesses the system. The calculator 10 is battery operated or may be adapted to operate both on battery of from the AC line. The user can access and use the calculator 10 in a normal calculating mode to perform normal computations. When the calculator 10 is to be used in a handicapping mode, the user merely depresses on of the four T keys as $T_1$ to $T_4$; depending upon the track he wishes to handicap at. Thus, assume the user is concerned with handicapping at a New York track, such as Belmont or Aqueduct. He then would depress the $T_1$ key. This operation places the calculator in the program mode as will be further explained. The user then enters four digits corresponding to the number of wins or first place finishes, the number of seconds or second place finishes, the number of third or third place finishes, the number of fourths or fourth place finishes. This data is available each year for each and every horse entered in a race via a racing form or a racing newspaper, as the Telegraph, or the Daily Racing Form published by Triangle Publications, Inc. Assume a particular horse to be handicapped in a race has five starts in 1 year and has one win, two seconds, no thirds and one fourth. The user then keys in the digits, 1,2,0,1, via the key board 11 of the calculator 10, and these digits are displayed. He then presses the E$x$ key and the numbers are used in the following formula to produce a Factor rating, where the factor rating to be described is as follows:

$$FACTOR = \frac{1}{.6(W) + .22(S) + .12(T) + .06(F)}$$

where
$W$ = the number of first place finishes
$S$ = the number of second place finishes
$T$ = the number of third place finishes
$F$ = the number of fourth place finishes The result of the calculation is immediately displayed. The user now depresses the (X) times keys and enters into the calculator via the keyboard 11, the earnings of the entry. He now depresses the equals (=) key and hence has multiplied the Factor by the earnings. As will be explained, this is the rating of the horse or entry.

The user can proceed to do this for each horse in a race based on certain other considerations as well to arrive at a rating or factor for each entry.

The entire consideration for selecting the horse and arriving at the above formula is more clearly described in a book entitled THE EDGE OF CLASS copyrighted on Apr. 14, 1975 in the Library of Congress, copyright number A 613901 by Sam Corkin, Jr., the inventor herein.

Before proceeding with a detailed explanation of the circuitry employed, certain considerations concerned with the system to be described, will be more fully explained.

Thoroughbred Racing enthusiasts agree in general that class is the single most important factor in determining or predicting the outcome of any given race. Opinions as to what is class are, however, wide ranging and inconsistent. The one factor that does exist for making a determination of class is the purse value of each race, or namely, the amount of money the entry is competing for.

Generally, the better the level of competition within the race, the higher the stake or the higher the purse value. In support of the above proposition and generally noting that stake race is highest and a Maiden Claiming race is lowest, the following purse values are offered in New York at tracks such as Belmont, Aqueduct and Saratoga.

| TYPE RACE | RANGE OF PURSE VALUE |
|---|---|
| Maiden Claiming | $7,000. to $8,500. |
| Maiden Special Weight | $7,000. to $9,500. |
| Claiming | $8,000. to $15,000. |
| Allowance | $9,000. to $20,000. |
| Stake | $25,000. to $250,000. |

An extremely important factor in determining class according to this invention is the distribution of the purse money according to each horse's finishing position in prior races during the year. For example, the New York tracks distribute the purse as follows:
  60% to the winner;
  22% to second place;
  12% to third place;
  6% to fourth place.

Thus, one can now see how the above formula for FACTOR was obtained.

In decimal, the distribution of purse is as follows for a New York track:
  0.6 (W) for wins
  0.22 (S) for seconds 0.12 (T) for thirds
0.06 (F) for fourth Hence, for the $T_1$ key or the New York track, the formula for Factor as above indicated, is the reciprocal of the sum of the above notations or $$FACTOR = \frac{1}{.6(W) + .22(S) + .12(T) + .06(F)}$$

The New Jersey, Maryland, Florida and California tracks may distribute the purse different and hence, the general formula for each track is:

$$FACTOR = \frac{1}{XW + YS + ZT + RF}$$

where
- $X$ = decimal equivalent of percentage of purse distributed to winner.
- $Y$ = decimal equivalent of percentage of purse distributed to second.
- $Z$ = decimal equivalent of percentage of purse distributed to third.
- $R$ = decimal equivalent of percentage of purse distributed to factor, and
- $W, S, T$, and $F$ = wins, seconds, thirds and fourths as above explained.

Therefore, by knowing the purse distribution at a specific track, it is possible to class every horse at that track independent of whatever track its earnings were compiled. Thus, all horses are handicapped according to this system using the same basis of comparison.

As an example, consider the following horse's earnings and finish positions as may be shown in a typical Racing Form.

|      | STARTS | 1st | 2nd | 3rd | EARNINGS |
|------|--------|-----|-----|-----|----------|
| 1975 | 2      | 1   | 1   | 0   | $12,300. |
| 1974 | 4      | 3   | 0   | 1   | $19,200. |

As can be ascertained, the entry of concern ran in four races in 1974 and earned $19,200 with three first places or wins, no second places and one third place finish. In 1975, the horse earned $12,300. for one win, one second, no thirds. By application of the purse distribution data, the horse's earnings can be accounted for as follows:

| 1974 | |
|---|---|
| 60% of $10,000. purse (three times) | = $18,000. |
| 12% of $10,000. purse (one time) | = $ 1,200. |
| | $19,200. TOTAL |
| 1975 | |
| 60% of $15,000. purse (one time) | = $ 9,000. |
| 22% of $15,000. purse (one time) | = $ 3,300. |
| | $12,300. TOTAL |

The purse value as indicated above, is information not available without a time consuming effort. From the above calculation, it can be seen that the horse had run in $10,000. purse races in 1974 and $15,000. purse races in 1975, thus showing a step-up in class in 1975 or the fact that the horse was facing better competition in 1975 than in 1974.

Determining the average purse value, as indicated, for which the horse had run and did well is extremely difficult as the Daily Racing Form and similar publications, do not list the purse value of the race, but only the type of race as allowance, claiming and so on.

The above formula is therefore used for calculating the average purse value or the class.

Applying the formula to the 1975 statistics for the above horse, one has the following factors:

$$W = 1, S = 1, T = 0, F = 0$$

It is noted that the number of fourth places was not given in the 1974 or 1975 listings and is not normally given as indicated above. However, this information in regard to fourth place (F) finishes is easily available by an examination of the horse's past performance charts, which show the last 10 races in detail. In the above problem, it is obvious that no fourth place finishes exist as in 1975, the horse had two starts and finished first in one and second in the other. Therefore, there is no thirds or fourth. Using the above formula for a New York purse, distribution and the above factors, one has the following:

$$FACTOR = \frac{1}{.6(1) + .22(1) + .2(0) + .06(0)}$$

one now multiplies the denominator factors to obtain:

$$FACTOR = \frac{1}{.6 + .22 + 0 + 0}$$

one now adds the denominator to obtain:

$$FACTOR = \frac{1}{.82}$$

one now divides the numerator by the denominator to obtain:

$$FACTOR = 1.219512195$$

This is the class factor.

The final result is obtained by multiplying the result of the formula or the class factor by the total earning of the horse or by $12,300., in the example for 1975 to obtain a figure of $14,999.9999; which of course, rounds off to $15,000. Thus, the class figure for this horse is $15,000. in 1975 evidencing the type of competition the horse can complete well within.

Thus the $15,000. result shows the purse value of the races in which the problem horse is running well and sharing in the purse.

A majority of the tracks in this country distribute the purse on approximately the same ratio, but some may include a fifth place distribution as well and hence, the above figures or formula can be modified accordingly. Thus, presently, four formulas at best indicative of the four T keys can be implemented and used, even though no more than two formulas may be necessary.

One then would compute the class figure for each horse in a race and select the horse with the highest class figure as his most likely choice. Other considerations which are disclosed in the above publication may eliminate a horse depending upon when he ran his last race and certain other factors as well, but are of no concern for the present application.

Figure 2:
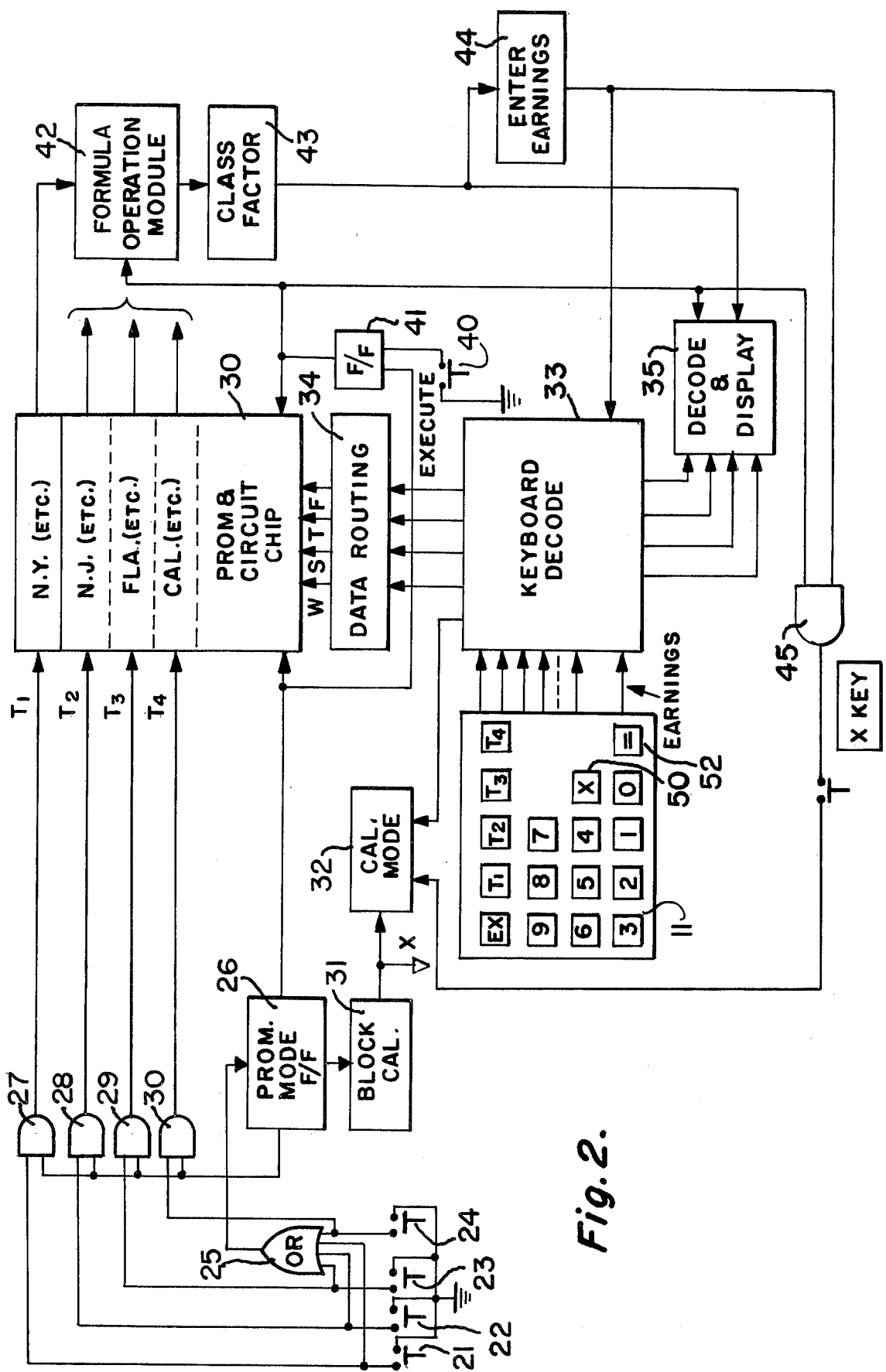
FIG. 2 is a detailed block diagram showing a circuit to implement a handicap scheme according to this invention.

Referring to FIG. 2, there is shown a block diagram of the handicap or class factor calculator section according to the invention. It is indicated that the block format for a general purpose calculator as above described, is well known and only will be referred to herein in the most general of terms as defining and specifying function which can be implemented in many conventional ways.

The keyboard 11 is as the keyboard 11 shown in FIG. 1 with many of the conventional keys, such as the plus (+) key and so on omitted, for clarity and ease of explanation.

According to the above description, the functioning of the apparatus is as follows:

As indicated, the handicapper or user first selects one of the four track keys as $T_1$ to $T_4$ by depressing the desired key. The keys $T_1$ to $T_4$ are shown on the left of the FIG. 2 and designated as 21, 22, 23 and 24, respectively.

One contact of each switch or key is directed to ground. The depression of a key as for example, the $T_1$ or key 21, causes an or gate 25 to be activated as will the depression of any other switch or key as 22, 23 or 24. As soon as this is done, the OR gate 25 sets the PROM. MODE circuit 26. This may be any ordinary flip-flop or bistable multivibrator as is known in the art. The PROM MODE circuit energizes all the AND gates 27, 28, 29 and 30. Another input of each gate is derived from the track switch 21 to 24. Thus, for depression of key or switch 21, gate 27 is activated and represents the selection of the $T_1$ switch and, of course, implements the triggering or selection of the program mode via the setting of the flip-flop 26.

A circuit designated as PROM and circuit chip 30 is shown and is essentially a special purpose chip containing a memory and registers for performing the mathematics as described above. The PROM chip 30 is divided into four sections, to be described for each formula, as above indicated, depending upon purse distribution as the particular track. Hence, for the depression of key 21, the $T_1$ section or the New York section of the PROM circuit 30 is selected.

Once this is done, all computations will be based on the above described formula for the New York track distribution.

The PROM MODE circuit also may inhibit normal calculator functions, except the multiplying and equal portions and is shown generally by the block calculator module 31 coupled to block 32 designated as calculator mode.

The block 32 is, of course, the normal components contained in a commercially available calculator such as the arithmetic registers and so on.

The user, as above indicated, now keys in the number of WINS (W), SECONDS (S), THIRDS (T) and FOURTHS (F) by use of the keyboard 20. He may do so by a number of techniques. For example, the unit can be programmed to accept two digits for each position or a total of eight digits (eight position display) for wins (W), SECONDS (S), THIRDS (T) and FOURTHS (F).

Thus, assume an entry has twenty starts with 11 wins, one second, seven thirds and no fourths. The user is instructed for example, to key in a one, one, a zero, one, a zero seven and a zero zero, resulting in a display of 11010700.

The information as keyed in is conventionally decoded in a keyboard decode circuit 33, which converts the decimal keys into a binary or other format. A data routing circuit 34 or a plurality of gates directs this information into the selected section of the PROM circuit 30, where it is stored for use in the computation according to the track formula pre-programmed into the requisite section of module 30.

While the user can be required to key in two digits for each win, second, third and fourth position, one may also require only one or two digits to be keyed followed by a decimal to instruct the logic circuits that the information as to wins (W) and so on is terminated and a new bit as seconds (S) is to be properly placed.

The data designated as W,S,T and F is stored in the PROM circuit 30 for operating on the same during the computation mode. The data entered in via the keyboard 11 is also displayed on the decode and display circuit 35 associated with the normal calculator. As soon as the data is proper as visualized by the user, he then depresses the EX or execute key, shown as key or switch 40 also referenced as Execute. The depression of this key sets the execute flip-flop 41 and instructs the PROM 30 to operate in a compute mode. The circuitry designated as FORMULA OPERATION MODULE 42 takes the stored data and implements the functions required by the formula, as above described. Thus, the data concerning the wins (W), seconds (S), thirds (T) and fourths (F) is processed according to the Factor formula as above indicated and the class factor is obtained.

The class factor as stored in a register or other module 43 is displayed on the display 35 associated with the calculator.

The computation of the class factor energizes an end of operation circuit 44 designated as enter earnings, and may also be a flip-flop. The output of the circuit 44 enables an AND gate 45, which has its other input primed by the execute flip-flop 41 to thereby release the multiply (x) or the key 50 associated with the normal calculator. Once the class factor is displayed, the user then inserts the earnings of the horse again via the keyboard 20. This entry replaces the class factor entry in the display as in a normal multiplication mode in a conventional calculator. The earnings as entered are multiplied by the class factor during a conventional calculator multiplying operation enabled by the unblocking of the multiplication mode via the gate 45. The user then presses the equal key 52 and hence, the product of the class factor and the earnings is displayed. The depression of the equal key can reset the entire system and the operation can be again repeated for a new entry.

Figure 3:
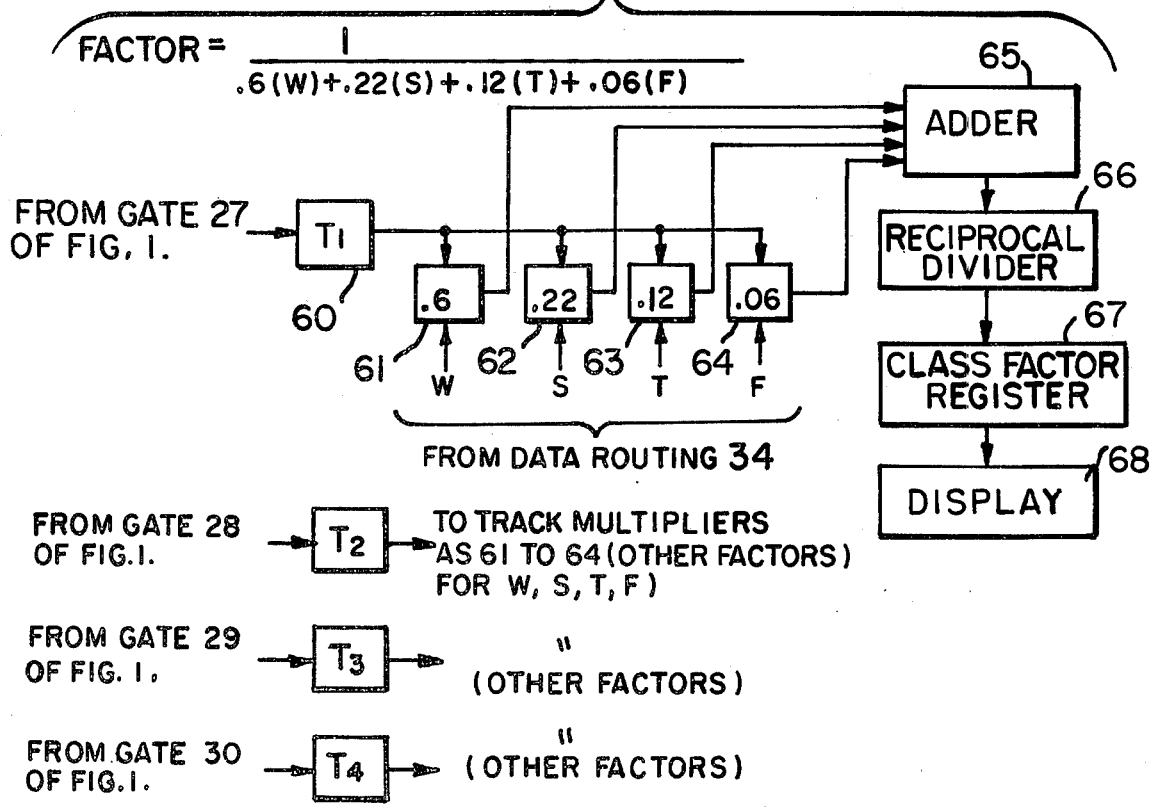
FIG. 3 is a block diagram of a section of circuitry used to compute ratings according to this invention.

Referring to FIG. 3, there is shown a simple block format of the $T_1$ section of the PROM and circuit chip 30 of FIG. 1.

Basically, the activation of the key 21 of FIG. 2 and the energization of gate 27 causes a $T_1$ binary 60 to set in the PROM circuit 30.

The setting of the flip-flop or binary 60 energizes the four binary multipliers 60 to 64. Each multiplier 60 to 64 is preset at the factory to multiply a received data stream by the factor of 0.6 for the W or win information as multiplier 61, 0.22 for the S information as multiplier 62, 0.12 for the T information as 63 and 0.06 for the F information as 64. Examples of suitable multipliers for both binary or decimal circuits can be had by a plurality of references as for example, by referring to a text entitled ARITHMETIC OPERATIONS IN DIGITAL COMPUTERS by R. K. Richards published by the D. Van Nostrand Company, Inc. (1958). Any such circuit will suffice. The PROM module 30 is a programmed read only memory chip and thus, such a circuit, many examples of which are commercially available as integrated circuit modules, can have information as multiplying factors and so on pre-programmed and stored therein.

Thus, each multiplier 61 to 64 receives the data via the data routing module 34 and performs the multiplication. The output of each multiplier is coupled to a binary adder or adder circuit 65 also a known circuit configuration and hence, the sum of $0.6W + 0.22S + 0.12T + 0.06F$ is provided at the output of adder 65. This sum is then divided into one or the reciprocal is taken via the reciprocal divider 66 to obtain the factor according to the formula depicted at the upper left hand corner of the FIG. 3. The output of the divider 66 is the class factor which can be stored in a register 67 and displayed in a conventional manner on the eight digit display as 68 (as display 35 of FIG. 2) associated with a normal calculator.

It should be evident that there is a section for each key as $T_1$ to $T_4$ in the PROM circuit 30, and each section differs by the multiplying factors of the modules as 60 to 64. It is also understood that the logic and circuits shown could be timed shared and implemented in other ways as well, without departing from the teachings afforded by this specification.

I claim:
1. A calculator of the digital type particularly adapted for indicating a rating of an entry in a racing contest by operating on the past performance of said entry as regarding past wins (W), past seconds (S) and past thirds (T) and total monies earned by said entry in said past performances, comprising:
    a. a keyboard for keying in a code having a given number of digits of a predetermined length indicative of past wins (W), past seconds (S) and past thirds (T),
    b. means responsive to said code for multiplying said keyed digits associated with said wins W, said seconds S and said thirds T each by a separate corresponding factor, to provide a separate product for W. S. and T,
    c. means responsive to said products for adding the same to provide a total sum,
    d. means responsive to said total sum for dividing the same into unity to produce at an output, a class factor,
    e. means responsive to said class factor for multiplying the same by said total monies earned to obtain a rating number, and
    f. means for displaying said rating number.

2. The calculator according to claim 1 wherein said means for multiplying said digits include a plurality of digital multiplying circuits to multiply said W digits by a factor of X, said S digits by a factor of Y and said T digits by a factor of Z.

3. The calculator according to claim 2, wherein: $X = 0.60, Y = 0.22, Z = 0.12$

4. The calculator according to claim 2 wherein said different preselected factors are selected according to a purse distribution at a given contest location whereby X is indicative of the percentage of the purse paid to an entry securing a win in a previous contest and Y is indicative of the percentage of the purse paid to a second place, and Z is indicative of the percentage paid to a third place.

5. The calculator according to claim 1 further including at least one additional digit for indicating past fourths (F).

6. Apparatus for indicating a rating of an entry in a racing contest by operating on the past performance of said entry as regarding past wins (W), past seconds (S) and at least one other position as thirds (T) and total monies earned by said entry in past performances, said rating provided according to predetermined factors selected according to the money distributed at a particular racing location or track in regard to the percentage of the purse (X) given for a WIN, the percentage of the purse (Y) given for a SECOND (S) and the percentage of the purse (Z) given for said other position, comprising:
    a. a numerical keyboard for keying in a number indicative of said past wins (W), past seconds (S) and said other past position (T), said keyboard further having a plurality of separate keys for selecting a purse distribution as determined by said racing location,
    b. a memory coupled to said keyboard and having a plurality of storage locations, each separate one associated with one of said separate keys for storing therein a predetermined number of said factors, each determined according to said purse distribution as X, Y and Z, and each location selectable by the activation of said associated key, said memory responsive upon said key selection to store therein said number indicative of said past wins W, seconds S and other position T,
    c. logic means responsive to said indications (W,S and T) being stored to process the same to provide a total number for an entry according to the summation of the products of said factors and said past positions as related to $XW + YS + ZT$,
    d. arithmetic means responsive to said total number for providing the reciprocal thereof indicative of a class factor
    e. means responsive to said arithmetic means providing said class factor for multiplying said class factor by said total monies earned for providing a rating, and
    f. display means coupled to said means for displaying said rating.

7. The apparatus according to claim 6, wherein: $X = 0.60, Y = 0.22, Z = 0.12$.

8. The apparatus according to claim 6 wherein W,S and T can be any integer between 0 to 99.

9. The apparatus according to claim 6 wherein X is a number between 0.1 and 0.8, Y is a number between 0.05 and 0.5, Z is a number between 0.05 and 0.5.

10. The apparatus according to claim 6 wherein X, Y and Z are predetermined according to the purse distribution at a given place of contest wherein X is equal to the decimal equivalent of the percentage of said purse given to a WIN (W), Y the decimal equivalent of the percentage of the purse given to a SECOND (S) and Z the decimal equivalent of the percentage of the purse given to a THIRD (T).

11. Apparatus for indicating the rating of an entry in a racing contest at a desired racing location by operating on the past performances of said entry as regarding past wins (W), past seconds (S) and at least one other finishing position as thirds (T), comprising:
    a. a memory having a plurality of selectable storage locations, each location capable of storing a set of numbers indicative of past wins (W), past seconds (S) and said at least one other finishing position (T), each location permanently storing a set of factors determined according to said desired racing location,
b. a keyboard coupled to said memory and having a first set of keys operative to select any one of said storage locations and a second set of keys operative to key in code indicative of said numbers as past wins ($w$), past seconds ($S$), and at least said one other finishing position ($T$),
c. logic means responsive to said selection of said memory location and said keyed code to provide at an output, a class factor manifesting an arithmetic combination of said stored factors as operating on said code, whereby said class factor is indicative of a rating for an entry, and
d. means for displaying said factor.

12. A calculator of the digital type particularly adapted to indicate a rating for any one of a plurality of entries in a racing contest at a predetermined racing location, said rating derived from past performance data as to position finished by said entry in previous contests, comprising:
a. a keyboard for keying in a predetermined number of digits indicative of a given position finished by said entry in previous contests as derived from said past performance data as (W) for past wins, (S) for past seconds and (T) for another past position,
b. memory means coupled to said keyboard for storing said predetermined digits, said memory means further having at least one storage location, indicative of said racing location, to store therein a plurality of factors associated with each of said past positions as X for wins, Y for seconds and Z for said another past position,
c. logic means responsive to said predetermined number of digits as stored to provide an output proportional to:

$$\frac{1}{XW + YS + ZT},$$

and
d. display means responsive to said output for displaying the same to provide an indication of a rating for said entry.

13. The calculator according to claim 12 wherein said plurality of factors as X, Y and Z are determined according to the percentage of a purse distribution at said racing location wherein X is proportional to the percentage of said purse allocated a winner, Y is proportional to the percentage of said purse allocated to a second and Z is proportional to the percentage of said purse allocated to said another position.

14. The calculator according to claim 12 further including means for multiplying said displayed output by the total earnings of said entry as determined by said past performance data.

* * * * *